US012373260B2

(12) United States Patent
Katyal et al.

(10) Patent No.: US 12,373,260 B2
(45) Date of Patent: Jul. 29, 2025

(54) CLOUD INFRASTRUCTURE RECOMMENDATIONS TO DEPLOY PODS

(71) Applicant: VMware LLC, Palo Alto, CA (US)

(72) Inventors: Hemani Katyal, Bangalore (IN); Krishna Karthik Reddy Jonnala, Hyderabad (IN); Gurusreekanth Chagalakondu, Bangalore (IN); Swati Singhvi, Bangalore (IN); Keshav S, Bangalore (IN)

(73) Assignee: VMware LLC, Palo Alto, CA (US)

( * ) Notice: Subject to any disclaimer, the term of this patent is extended or adjusted under 35 U.S.C. 154(b) by 902 days.

(21) Appl. No.: 17/546,091

(22) Filed: Dec. 9, 2021

(65) Prior Publication Data
US 2022/0374267 A1    Nov. 24, 2022

(30) Foreign Application Priority Data
May 20, 2021    (IN) .............................. 202141022649

(51) Int. Cl.
*G06F 9/455* (2018.01)
*G06F 9/46* (2006.01)
*G06F 9/50* (2006.01)

(52) U.S. Cl.
CPC ............ *G06F 9/505* (2013.01); *G06F 9/5055* (2013.01)

(58) Field of Classification Search
CPC ...... G06F 9/505; G06F 9/5055; G06F 9/5005; G06F 9/5027; G06F 9/5033; G06F 9/5038; G06F 9/5044; G06F 9/5061; G06F 9/5077; G06F 9/45533; G06F 9/45558; G06F 2009/45562; G06F 2009/4557

See application file for complete search history.

(56) References Cited

U.S. PATENT DOCUMENTS

| | | | | |
|---|---|---|---|---|
| 11,403,150 | B1* | 8/2022 | Featonby | .............. G06F 9/5077 |
| 2001/0047358 | A1* | 11/2001 | Flinn | ....................... H04L 41/22 |
| 2014/0278326 | A1* | 9/2014 | Sharma | ................. G06F 9/5066 |
| | | | | 703/13 |
| 2017/0068557 | A1* | 3/2017 | Cropper | .............. G06F 9/45558 |
| 2017/0104806 | A1* | 4/2017 | Zhao | ....................... H04L 65/80 |
| 2017/0302523 | A1* | 10/2017 | Shah | ................... G06F 9/45558 |
| 2021/0019194 | A1* | 1/2021 | Bahl | ................... H04L 67/1031 |
| 2022/0385542 | A1* | 12/2022 | Gokan Khan | .......... H04L 41/40 |

* cited by examiner

*Primary Examiner* — April Y Blair
*Assistant Examiner* — Zhi Chen
(74) *Attorney, Agent, or Firm* — Quarles & Brady LLP

(57) ABSTRACT

In an example, a computer implemented method may include receiving a request including a set of workload descriptors. Further, the method may include parsing the set of workload descriptors to determine a set of pods and a set of constraints associated with the set of pods and determining a relationship between the set of pods based on the set of constraints. Furthermore, the method may include categorizing the set of pods into a set of resource clusters based on the determined relationship and determining a cloud infrastructure to deploy the set of resource clusters based on an optimization parameter. Upon determining the cloud infrastructure, the determined cloud infrastructure may be recommended to deploy the set of resource clusters.

24 Claims, 9 Drawing Sheets

|       | POD 1 | POD 2 | POD 3 | POD 4 | POD 5 |
|-------|-------|-------|-------|-------|-------|
| POD 1 | X     | 1     | 0     | 0     | 0     |
| POD 2 | 1     | X     | 0     | -1    | 0     |
| POD 3 | 0     | 0     | X     | -1    | 0     |
| POD 4 | 0     | -1    | -1    | X     | 0     |
| POD 5 | 0     | 0     | 0     | 0     | X     |

200B

|    | R1 | R2 | R3 | R4 |
|----|----|----|----|----|
| R1 | X  | 0  | -1 | 0  |
| R2 | 0  | X  | -1 | 0  |
| R3 | -1 | -1 | X  | 0  |
| R4 | 0  | 0  | 0  | X  |

200C

| | CPU 202 | MEMORY 204 | STORAGE 206 | POD AFFINITY SPECIFICATION 208 | POD ANTI-AFFINITY SPECIFICATION 210 | TOLERATION SPECIFICATION 212 |
|---|---|---|---|---|---|---|
| POD 1 | 2 | 10 GB | 10 GB | APPLABEL-1 | NA | NODELABEL-1 |
| POD 2 | 1 | 5 GB | 20 GB | APPLABEL-1 | APPLABEL-2 | NODELABEL-1 |
| POD 3 | 2 | 10 GB | NA | NA | APPLABEL-3 | NA |
| POD 4 | 7 | 30 GB | NA | NA | APPLABEL-2, APPLABEL-3 | NODELABEL-2 |
| POD 5 | 2 | 5 GB | NA | NA | NA | NA |

|       | POD 1 | POD 2 | POD 3 | POD 4 | POD 5 |
|-------|-------|-------|-------|-------|-------|
| POD 1 | X     | 1     | 0     | 0     | 0     |
| POD 2 | 1     | X     | 0     | -1    | 0     |
| POD 3 | 0     | 0     | X     | -1    | 0     |
| POD 4 | 0     | -1    | -1    | X     | 0     |
| POD 5 | 0     | 0     | 0     | 0     | X     |

FIG. 2B

|    | R1 | R2 | R3 | R4 |
|----|----|----|----|----|
| R1 | X  | 0  | -1 | 0  |
| R2 | 0  | X  | -1 | 0  |
| R3 | -1 | -1 | X  | 0  |
| R4 | 0  | 0  | 0  | X  |

FIG. 2C

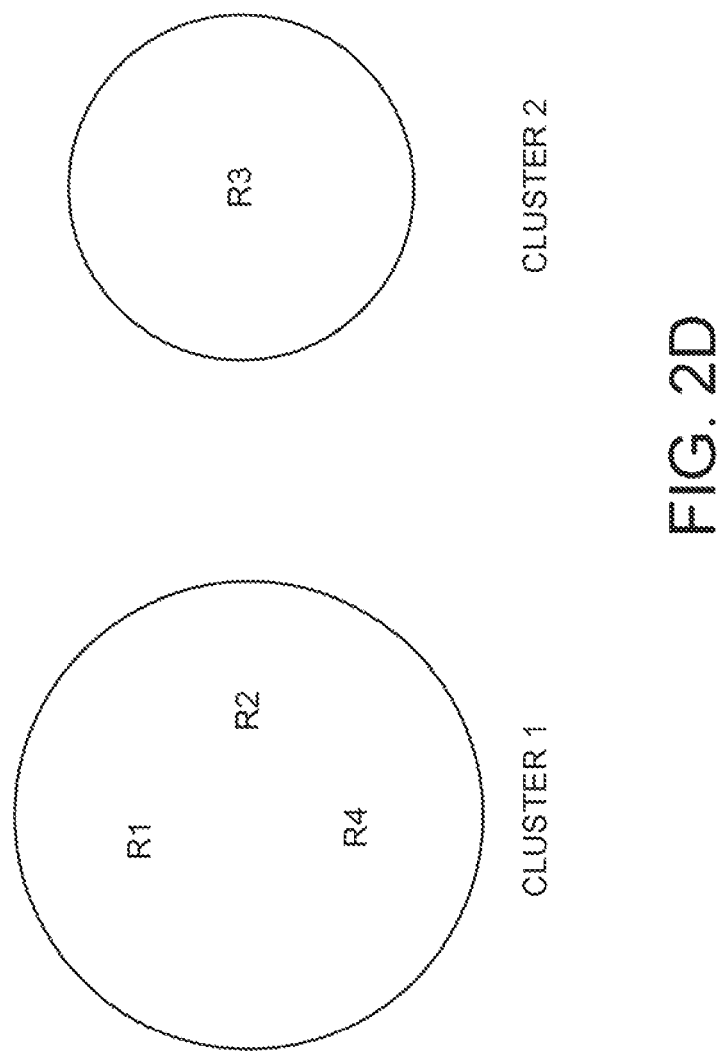

AWS
CPU : 28 VCPU
CPU COST : 818.29$/MONTH
MEMORY : 28.5 GB
MEMORY COST : 818.28$/MONTH
TOTAL COST : 3301.93 $/MONTH

VIEW DETAILS

| INSTANCE TYPE | OS | CPU (vCPU) | MEMORY (GB) | CPU COST ($/MONTH) | MEMORY COST ($/MONTH) | TOTAL COST ($/MONTH) |
|---|---|---|---|---|---|---|
| C3.XLARGE | NA | 4.00 | 7.50 | 7.20 | 7.20 | 14.40 |
| C1.XLARGE | SUSE | 8.00 | 7.00 | 270.36 | 270.36 | 540.72 |
| C1.XLARGE | SUSE | 8.00 | 7.00 | 270.36 | 270.36 | 540.72 |
| C1.XLARGE | SUSE | 8.00 | 7.00 | 270.36 | 270.36 | 540.72 |

DONE

FIG. 4B

| PURSER | | | | | |
|---|---|---|---|---|---|
| CUSTOM GROUPS | COMPARE CLOUDS 472 | | | | |
| CUSTOM GROUPS | | | | | |
| COMPARE | AWS | GCP | AZURE | PKS | |
| PLAN INFRASTRUCTURE | US-WEST-1 ⌄ | US-EAST-1 ⌄ | EASTUS ⌄ | US-EAST-1 ⌄ | |
| ADMIN | CPU : 554 VCPU<br>CPU COST : 9546.19 $/MONTH<br>MEMORY : 4211 GB<br>MEMORY COST : 30312.43 $/MONTH<br>TOTAL COST : 401063.90 $/MONTH | CPU : 554 VCPU<br>CPU COST : 12609.00 $/MONTH<br>MEMORY : 4142 GB<br>MEMORY COST : 12635.75 $/MONTH<br>TOTAL COST : 254475.77 $/MONTH | CPU : 554 VCPU<br>CPU COST : 9573.12 $/MONTH<br>MEMORY : 4419.5 GB<br>MEMORY COST : 31820.40 $/MONTH<br>TOTAL COST : 416988.72 $/MONTH | CPU : 554 VCPU<br>CPU COST : 19186.13 $/MONTH<br>MEMORY : 4142 GB<br>MEMORY COST : 10736.06 $/MONTH<br>TOTAL COST : 301771.15 $/MONTH | |
| | VIEW DETAILS | VIEW DETAILS | VIEW DETAILS | VIEW DETAILS | |
| | BACK | | | | |

400C

FIG. 4C

CLOUD INFRASTRUCTURE RECOMMENDATIONS TO DEPLOY PODS

RELATED APPLICATION

Benefit is claimed under 35 U.S.C. 119(a)-(d) to Foreign Application Serial No. 202141022649 filed in India entitled "SYSTEMS AND METHODS FOR RECOMMENDING WORKLOAD AWARE INFRASTRUCTURES", on May 20, 2021, by VMware, Inc., which is herein incorporated in its entirety by reference for all purposes.

TECHNICAL FIELD

The present disclosure relates to virtual computing environments, and more particularly to methods, techniques, and systems for recommending a cloud infrastructure to deploy pods (e.g., one or more containers).

BACKGROUND

A containerized environment may be used to run applications on a distributed computing system or a cloud computing system. For instance, various services of an application may be packaged into containers. Kubernetes is an open-source container-orchestration system for automating application-deployment, scaling, and management. Kubernetes defines a set of building blocks, referred to as primitives, which collectively provide mechanisms that deploy, maintain, and scale applications based on processor, memory, or custom metrics. A pod is a Kubernetes building block that includes one or more containers that are co-located on a host machine and that can share resources. A node, which may be a virtual machine (VM) or physical machine, is a worker machine in Kubernetes that executes one or more pods. Each node contains the services necessary to run the pods.

BRIEF DESCRIPTION OF THE DRAWINGS

FIG. 2B is an example pod relation matrix corresponding to the set of pods of FIG. 2A;

FIG. 2C is an example resource group relation matrix, corresponding to a set of resource groups, generated based on the pod relation matrix of FIG. 2B;

FIG. 2D is an example graphical representation, depicting clusters of the resource groups of FIG. 2C;

FIG. 4B is an example graphical user interface, depicting an offering of an example cloud infrastructure based on the set of workload descriptors of FIG. 4A;

FIG. 4C is an example graphical user interface, depicting an option to compare different cloud infrastructures offered by different cloud provides.

Figure 1:
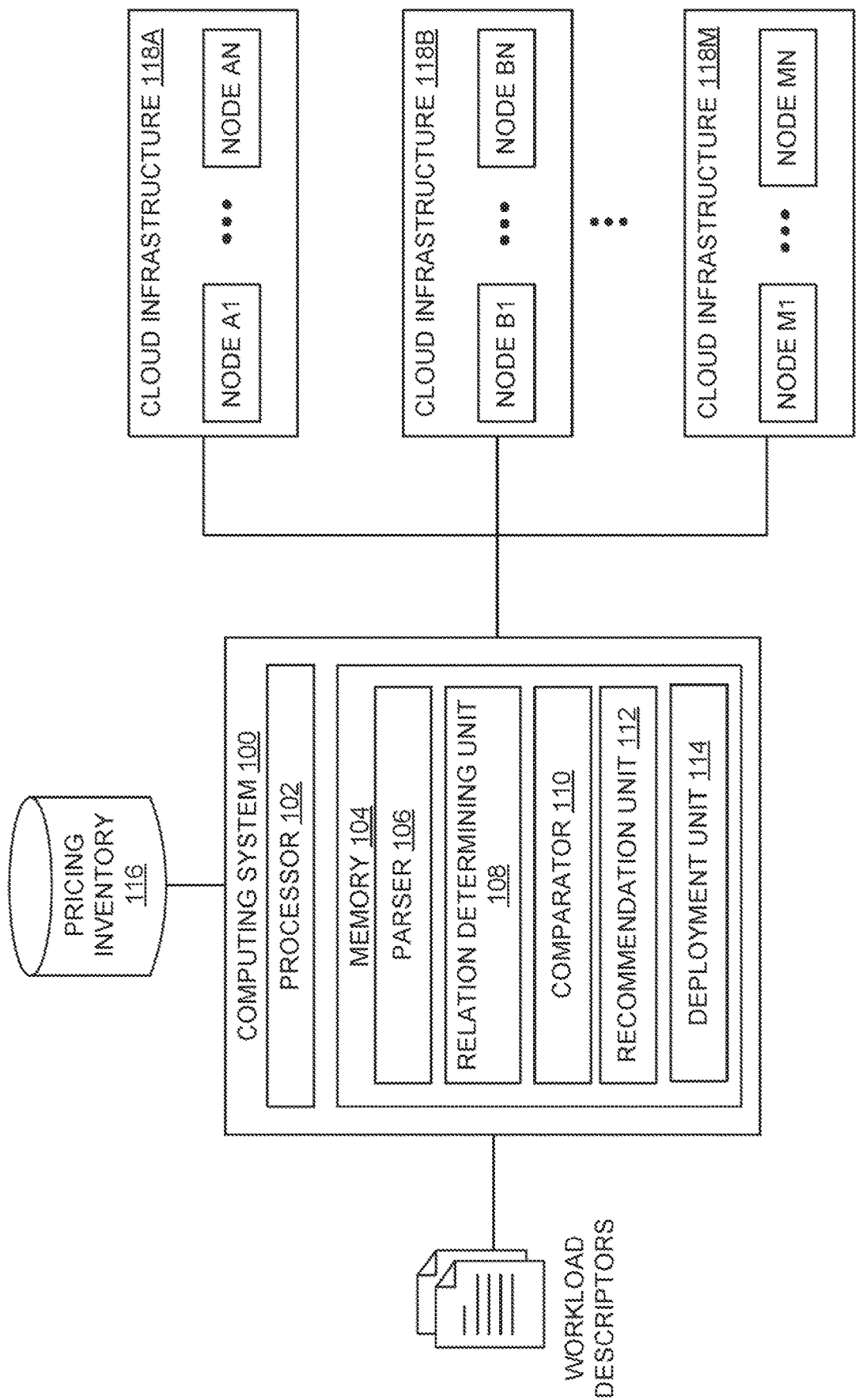
FIG. 1 is a block diagram of an example computing system, including a recommendation unit to recommend a cloud infrastructure for deploying pods.

The drawings described herein are for illustration purposes and are not intended to limit the scope of the present subject matter in any way.

DETAILED DESCRIPTION

As containers (i.e., also referred to as containerized applications) gain popularity, the containers may be extensively used in both private and public clouds. A container or containerized application is an instance of a user-space running an application within an operating system (OS) of a host device (e.g., a server) or a virtual machine being executed by the host device. Containers enable OS-level virtualization in which the OS kernel allows the existence of multiple isolated containers. A container may provide an executable environment with a complete filesystem. The filesystem may contain code, runtime, system tools, system libraries, and so on. That is, execution of a container can be the same regardless of the underlying infrastructure. A "Docker" is one of the popular existing platforms for creating, migrating, managing, and deploying containers.

A container, unlike a virtual machine, does not require or include a separate OS. Rather, the container relies on the kernel's functionality and uses hardware resources (e.g., central processing unit (CPU), memory, I/O, network, and the like) and separate namespaces to isolate the application's view of the OS. Containers may be served using a container orchestrator such as Kubernetes® or Docker Swarm®, which manages the life cycle of the containers. The container orchestrator may handle placement and scale concerns, i.e., the container orchestrator may decide where to best place a container between a swarm of nodes (e.g., virtual machines or physical servers), how to update the container deployments based on a heath check, how many replicas to maintain, and the like.

In order to deploy the containers on one or more nodes, service teams may provide resource requirements and node constraints in a form of a configuration file (e.g., a YAML Ain't Markup Language (YAML) file) to an operations team. Further, the operations team may have to select a cloud provider and determine cloud infrastructure (i.e., a cluster of nodes) for deploying the containers or pods based on the YAML configuration. A pod may refer to a group of related containers that can be collocated on a node. So, a node is considered available if the node can satisfy the requirements of the containers in a pod. Thus, the focus of the operations team in provisioning a new cluster is to select the cloud infrastructure and deploy an optimized and cost-effective cluster using the YAML configuration.

Thus, adoption of cloud-based infrastructures along with an increasing demand for hybrid and multi-cloud support may involve the operations team to work round the clock to manage the cloud offerings. Further, the cloud providers may offer a variety of cloud instance types (i.e., nodes) designed to suit varying usage needs of the workloads (i.e., containerized applications). The cloud instance types may be classified into categories such as memory-optimized, storage-optimized, and the like.

In such scenarios, the operations team may have the following challenges to build a new cluster or migrate the pods to the new cluster:

choosing a cloud infrastructure with a suitable instance type that is also cost-effective for a given workload (i.e., a containerized application).

choosing a cloud provider from multiple available cloud providers.

Thus, existing methods to select the cloud provider and determine the Kubernetes nodes to be provisioned may be manual, which involves a knowledge of studying Kubernetes scheduling constraints of each YAML configuration provided by the various service teams. Further, the decision (i.e., choosing the cloud provider and determining the cloud infrastructure to deploy the cluster) may be based on a trial-and-error approach using guesstimating capabilities of the operations team. Furthermore, as the number of YAML configurations to be deployed increases, the manual planning of the cluster may be challenging.

Examples described herein may provide a recommendation system to recommend a cloud infrastructure (i.e., an optimized and cost-effective cloud infrastructure) to deploy pods. During operation, a request including a set of workload descriptors may be received. Further, the set of workload descriptors may be parsed to determine a set of pods and a set of constraints associated with the set of pods. Furthermore, a relationship between the set of pods may be determined based on the set of constraints. Based on the determined relationship, the set of pods may be categorized into a set of resource clusters. Further, a cloud infrastructure to deploy the set of resource clusters may be determined based on an optimization parameter. Furthermore, the determined cloud infrastructure may be recommended to deploy the set of resource clusters. Thus, examples described herein may provide a recommendation system that can understand container requirements and can suggest an optimal cloud infrastructure for deploying the containers or pods.

In the following description, for purposes of explanation, numerous specific details are set forth in order to provide a thorough understanding of the present techniques. The present apparatuses, devices, and systems may be practiced without these specific details. Reference in the specification to "an example" or similar language means that a particular feature, structure, or characteristic described is included in at least that one example, but not necessarily in other examples.

System Overview and Examples of Operation

FIG. 1 is a block diagram of an example computing system 100, including a recommendation unit 112 to recommend a cloud infrastructure for deploying pods. An example cloud infrastructure (e.g., 118A to 118M) may include a datacenter having multiple physical host devices, virtual machines, and/or containers to execute different types of applications. For example, the cloud infrastructure may include hardware and software components, such as servers, storage, networking, virtualization software, services, and management tools, that support computing requirements of customers. Further, multiple cloud providers may offer different cloud infrastructures (e.g., 118A to 118M) (e.g., Amazon Web Services™ (AWS), Google Cloud Platform™ (GCP), Microsoft Azure™, Pivotal Container Service™ (PKS), and the like) based on usage or computing requirements of the customers.

As shown in FIG. 1, computing system 100 may include a processor 102 and a memory 104 coupled to processor 102. In an example, computing system 100 may be a part of a recommendation system (e.g., a management server or a management node) to recommend deployment of containers or pods on a cluster of nodes (e.g., nodes A1-AN, nodes B1-BN, or nodes M1-MN) associated with the cloud infrastructure (e.g., one of 118A to 118M). In this example, deployment of containers or pods in the cluster may be implemented as a part of deployment planning of a multi-cloud cluster, Geo expansion planning of an existing cluster, or migration planning of the existing cluster, which may involve setting up a new cluster of nodes in the cloud infrastructure.

As shown in FIG. 1, memory 104 may include a parser 106, a relation determining unit 108, a comparator 110, a recommendation unit 112, and a deployment unit 114. During operation, parser 106 may receive a request including a set of workload descriptors. The request is to deploy a plurality of containers in a cluster (e.g., one or more nodes). The workload descriptors may represent container requirements (e.g., resource requirements, configuration information, node constraints, and the like) to deploy the containers. In an example, the request including the set of workload descriptors may be received in the form of a YAML Ain't Markup Language (YAML) file.

Further, parser 106 may parse the set of workload descriptors to determine a set of pods and a set of constraints associated with the set of pods. An example pod may refer to a group of one or more containers, such as Docker containers, that can be co-located on a node. When a pod runs multiple containers, the containers are managed as a single entity and share the pod's resources. Further, the set of constraints may be selected from a group consisting of a pod affinity specification, a pod anti-affinity specification, a toleration specification, and the like.

In an example, the pod affinity specification and the pod anti-affinity specification may allow preferential relative placement of the pods based on specified labels. For example, the pods having a same affinity specification can be co-located on a same node and the pods having a same anti-affinity specification cannot be co-located on the same node. For example, the pod affinity specification may enable a first pod to locate on the same node as a second pod when an affinity label on the first pod matches an affinity label on the second pod. Similarly, the pod anti-affinity specification may prevent a first pod from locating on the same node as a second pod when an anti-affinity label on the first pod matches an anti-affinity label on the second pod.

Further, the toleration specification may be used in conjunction with a proposed taint key. The toleration specification and the taint key are used to reserve a node for scheduling specific pods by marking the node as inappropriate for the other pods. Thus, the toleration specification may be a feature to allow the pods to schedule onto nodes with matching taint keys. The taint keys and toleration specifications may work together to ensure that the pods are not scheduled onto inappropriate nodes. For example, one or more taint keys are applied to a node, which marks that the node not to accept any pods that do not tolerate the taint keys. Further, the toleration specifications may be applied to the pods, which may allow the pods to schedule onto the nodes with the matching taint keys. Furthermore, the resource requirements such as CPU, memory, and storage may account for compute and storage requirements for the pods.

Figure 2A:
FIG. 2A is an example table depicting a set of pods and associated set of constraints.

An example table 200A depicting an example set of pods and associated set of constraints is shown in FIG. 2A. Example table 200A depicts the set of pods (e.g., pods 1 to 5), corresponding resource requirements (e.g., CPU 202, memory 204, and storage 206), and corresponding constraints (e.g., a pod affinity specification 208, a pod anti-affinity specification 210, and a toleration specification 212). In the example table 200A, pods 1 and 2 include same pod affinity label (i.e., APPLABEL-1), so pods 1 and 2 can be placed on a same node. Further, pods 2 and 4 include same pod anti-affinity label (i.e., APPLABEL-2), so pods 2 and 4 cannot be placed on a same node. Similarly, pods 3 and 4 include same pod anti-affinity label (i.e., APPLABEL-3), so pods 3 and 4 cannot be placed on a same node. Even though example table 200A is explained using constraints such as pod affinity specification 208, pod anti-affinity specification 210, and toleration specification 212, other type of constraints may also be used in provisioning the clusters.

Referring back to FIG. 1, relation determining unit 108 may determine a relationship between the set of pods based on the set of constraints. An example relationship may include an attract relationship, a repel relationship, or a neutral relationship. The attract relationship or the repel relationship between a pair of pods may indicate that the pair of pods is to be placed on a same node or different nodes, respectively. In an example, relation determining unit 108 may determine the relationship between the set of pods and generate a pod relation matrix based on the determined relationship. The pod relation matrix may represent the relationship between the set of pods based on the set of constraints.

An example pod relation matrix 200B corresponding to pods 1 to 5 of FIG. 2A is depicted in FIG. 2B. For example, for any combination of two pods from the pods 1 to 5, relation determining unit 108 may categorize the pods into one of the three relation classes based on a scheduling policy as defined below:

Attract relation class: in this class, the pods can be deployed into same node.
Repel relation class: in this class, the pods to be deployed into different nodes.
Neutral relation class: in this class, the pods can be deployed in same/different nodes.

In an example, relation determining unit 108 may determine the relation between the pods 1 to 5 using the container requirements depicted in table 200A of FIG. 2A. For example, pods 1 and 2 have a same affinity label (i.e., APPLABEL-1), so pods 1 and 2 may be categorized as the attract relation class (e.g., represented as '1' in pod relation matrix 200B). Pods 2 and 4 have a same anti-affinity label (i.e., APPLABEL-2), so pods 2 and 4 may be categorized as the repel relation class (e.g., represented as '−1' in pod relation matrix 200B). Similarly, pods 3 and 4 have a same anti-affinity label (i.e., APPLABEL-3), so pods 3 and 4 may be categorized as the repel relation class (e.g., represented as '−1' in pod relation matrix 200B). Further, pods 1 and 2 include a same toleration-label (i.e., NODELABEL-1), so pods 1 and 2 may be categorized as the attract relation class. Furthermore, pods 1 and 4 have different toleration-labels (i.e., NODELABEL-1 and NODELABEL-2, respectively) and pods 2 and 4 have different toleration-labels (i.e., NODELABEL-1 and NODELABEL-2, respectively). Therefore, pods 1 and 4, and pods 2 and 4 may be categorized as the repel relation class. Further, when any two pods do not fall into either attract or repel relation class (e.g., based on previous associations), then the pods may be categorized as the neutral relation class (e.g., represented as '0' in pod relation matrix 200B).

Further in FIG. 1, relation determining unit 108 may categorize the set of pods into a set of resource clusters based on the determined relationship. In an example, relation determining unit 108 may categorize the set of pods into the set of resource clusters by:

categorizing the set of pods into a set of resource groups based on the determined relationship. For example, a resource group may include one or more pods having an attract relation.

determining a relationship between the resource groups based on the set of constraints of pods in each resource group. In an example, relation determining unit 108 may determine the relationship between the resource groups and generate a resource group relation matrix based on the relationship between the resource groups. The resource group relation matrix may represent the relationship between the set of resource groups based on the set of constraints.

categorizing the set of resource groups into the set of resource clusters based on the relationship between the resource groups and resource requirements (e.g., CPU, memory, and storage requirements) of the resource groups. For example, a resource cluster may include one or more resource groups.

In an example, relation determining unit 108 may group the pods with the attract relation class into a same resource group. For example, based on pod relation matrix 200B of FIG. 2B, pods 1 and 2 may be grouped into a resource group R1 as pods 1 and 2 are categorized as the attract relation class. Further, pod 3, pod 4, and pod 5 do not have any attract relation with any other pod. Therefore, pod 3, 4, and 5 may be included in separate resource groups R2, R3, and R4, respectively. In other examples, when pods A and B have an attract relation and pods B and C also have an attract relation, then based on a transitive association, pods A, B, and C can be grouped into one resource group. Upon the pods (i.e., pods 1-5) are categorized into resource groups (i.e., R1-R4), the resource group relation matrix may be created between the resource groups based on the following two conditions:

If any pod in a first resource group has a repel relation with any pod in a second resource group, then the first and second resource groups have a repel relation.
If every pod of a first resource group has neutral relation with every pod of a second resource group, then the first and second resource groups have a neutral relation.

An example resource group relation matrix 200C including relationships between resource groups R1 to R4 is depicted in FIG. 2C. As shown in example resource group relation matrix 200C, resource groups R1 and R3 have a repel relation and resource groups R2 and R3 have a repel relation (e.g., represented as '−1' in resource group relation matrix 200C). Further, resource groups R1 and R2, R1 and R4, R2 and R4, and R3 and R4 have a neutral relation (e.g., represented as '0' in resource group relation matrix 200C).

Further, other container requirements such as the CPU and memory requirements may be computed for resource groups R1, R2, R3, and R4. The CPU requirement of a resource group is a sum of CPU requirements of the pods in the resource group. The memory requirement of a resource group is a sum of memory requirements of the pods in the resource group. The CPU and memory requirements may be computed using the equations (1) and (2):

$$R^{CPU} = \Sigma_{P_i \in R} P_i^{CPU} \tag{1}$$

$$R^{Memory} = \Sigma_{P_i \in R} P_i^{Memory} \tag{2}$$

Where, R refers to a resource group, $R^{CPU}$ refers to a CPU requirement of the resource group, $R^{Memory}$ refers to memory requirement of the resource group, $P_i$ refer to a pod in the resource group, $P_i^{CPU}$ refers to a CPU requirement of the pod, and $P_i^{MEMORY}$ refers to a memory requirement of the pod.

The CPU and memory requirements may be considered along with the determined relationships between the resource groups to categorize the resource groups R1 to R4 into resource clusters (e.g., cluster 1 and cluster 2). An example table 1 depicting CPU and memory requirements for the resource groups R1-R4 is shown below.

TABLE 1

|  | R1 | R2 | R3 | R4 |
|---|---|---|---|---|
| vCPU | 3 | 2 | 7 | 2 |
| Memory | 15 GB | 10 GB | 30 GB | 5 GB |

Based on resource group relation matrix 200C, different resource clusters may be generated such that no resource groups with a repel relation can be placed in a same resource cluster. Further, the resource groups having a neutral relation may be grouped into a same resource cluster. In this example, if a resource group has a neutral relation with more than one resource cluster, then the resource cluster with a least compute and/or storage capacity may be selected. For example, consider the resource groups R1 to R4 as depicted in resource group relation matrix 200C of FIG. 2C. Based on resource group relation matrix 200C, R1 and R3 have a repel relation. Thus, R1 and R3 may be grouped into two different resource clusters, i.e., cluster 1 and cluster 2, respectively, as shown below.

Cluster 1={R1}

Cluster 2={R3}

Further, R2 has a repel relation with R3 and hence R2 cannot be placed into cluster 2. However, R2 has a neutral relation with R1. Hence, R2 can be placed into cluster 1 as shown below.

Cluster 1={R1,R2}

Furthermore, R4 does not have a repel relation with resource groups R1, R2, and R3. Hence, R4 can be placed either in cluster 1 or cluster 2. In such a scenario, a resource cluster with less compute and/or storage capacity (or a random resource cluster in case of a conflict) may be selected. In this example, cluster 1 with vCPU=5 ($R1^{CPU}$+$R2^{CPU}$ (i.e., 2+3) as per table 1) and memory=25 GB ($R1^{MEMORY}$+$R2^{MEMORY}$ (i.e., 15+10) as per table 1) has less compute capacity than cluster 2 with vCPU=7 ($R3^{CPU}$ as per table 1) and memory=30 GB ($R3^{MEMORY}$ as per table 1). Thus, R4 may be included in cluster 1 as shown below.

Cluster 1={R1,R2,R4}

An example clustering of the resource groups R1 to R4 for the above example is graphically represented in FIG. 2D. Referring back to FIG. 1, comparator 110 may determine a cloud infrastructure to deploy the set of resource clusters (e.g., cluster 1 and cluster 2) based on an optimization parameter. The cloud infrastructure may include the nodes (e.g., virtual machines or physical servers) for deploying pods in the set of resource clusters. An example optimization parameter may include a resource optimization parameter, a cost optimization parameter, or a combination thereof.

In an example, comparator 110 may determine the cloud infrastructure by:
determining an inventory layout for each resource cluster.
The inventory layout may include a plurality of combinations of resource groups that are supported by nodes associated with the different cloud service providers. In an example, comparator 110 may determine the inventory layout by filtering the nodes having a resource capacity greater than a threshold percentage of resource requirements of each of the resource groups.
selecting the cloud infrastructure associated with one of the cloud service providers based on the inventory layout associated with the set of resource clusters and the optimization parameter.

In an example, comparator 110 may generate a comparison between different cloud service providers to deploy the set of resource clusters based on the optimization parameter. Further, comparator 110 may determine the cloud infrastructure associated with one of the cloud service providers based on the comparison. In an example, the optimization parameter may include a cost attribute. In this example, comparator 110 may select the cloud infrastructure by comparing the cost attribute associated with different cloud service providers to deploy the set of resource clusters based on the inventory layout. Further, comparator 110 may select the cloud infrastructure associated with one of the cloud service providers based on the comparison.

In these examples, comparator 110 may consider different combinations of resource groups and for each combination, comparator 110 may evaluate the closest fit node that can satisfy the combinations. Consider the resource clusters 1 and 2 as shown in FIG. 2D. In this example, the resource cluster 1 with resource groups R1, R2, and R4 may have the following possible combinations:

Provisioning R1, R2, and R4 in different nodes.
Provisioning R1 and R2 in one node and R4 in another node.
Provisioning R1 and R4 in one node and R2 in another node.
Provisioning R2 and R4 in one node and R1 in another node.
Provisioning R1, R2, and R4 in a single node.

In an example, a node capacity may be equal to a sum of compute resource requirements (e.g., CPU and memory taken individually). For each different node from the above combinations, the closest fit node for the combination may be determined using a stored pricing inventory 116 of the cloud providers instance price list. Example pricing inventory 116 may be a database used to store the pricing data of the cloud providers. In this example, comparator 110 may be used to evaluate a cost-optimal infrastructure for deploying the resource clusters based on the comparison between the stored pricing data for the different cloud providers. Thus, comparator 110 may determine a cost-optimal set of nodes (i.e., compute instances) for deploying the pods in the resource clusters 1 and 2.

In the above example, the closest fit node may be determined by filtering out the nodes (i.e., compute instances) having a greater capacity than the required node and selecting a node having a minimum cost among them. Thus, a cost-optimal instance for the desired node may be ensured. Further, costs for the nodes in a combination may be added and the one with minimum total node cost for the combination may be selected. Thus, for resource cluster 1 having resource groups R1, R2, and R4, a set of nodes (e.g., cost-optimal combination) may be determined, on which the pods in the resource groups R1, R2, and R4 may be deployed. For example, the determined set of nodes (i.e., an output) may be expressed as shown below.

Output=Min(combination of nodes with the least total cost).

Similarly, for the resource cluster 2 having resource group R3, one or more nodes (e.g., cost-optimal combination) may be determined, on which the pods in the resource group R3 may be deployed. Further, costs associated with the resource clusters (e.g., resource cluster 1 and resource cluster 2) corresponding to the multiple cloud providers may be determined. Then, the cloud infrastructure (i.e., the nodes) associated with a cloud provider with minimum total cost to deploy the resource clusters may be selected from the multiple cloud providers.

Further in FIG. 1, recommendation unit 112 may recommend the determined cloud infrastructure to deploy the set of resource clusters. Furthermore, deployment unit 114 may deploy pods in the set of resource clusters on the determined cloud infrastructure in accordance with the recommendation. In an example, deployment unit 114 may deploy pods on the determined cloud infrastructure based on a user input. The user input is to confirm or select the cloud infrastructure to deploy the pods based on the recommendation. In some examples, deployment unit 114 may be a container orchestrator such as Kubernetes or Docker Swarm, which may deploy pods in nodes of the recommended cloud infrastructure.

In other examples, comparator 110 may also consider services that are needed to run on the nodes to execute the pods. For example, comparator 110 may consider Kubernetes resource type daemon sets which have to be deployed on the nodes as well as the default services (e.g., Kube system applications) deployed in the cluster and their impact on planning the infrastructure. A daemon set may ensure that the nodes run a copy of a pod. The daemon set may manage groups of replicated pods. The Kubernetes may deploy default Kube system applications on each node such as Kubelet. In order to consider these applications, comparator 110 may deduct an amount of compute from the node's capacity which may be effective node capacity that can be used to deploy user applications.

Furthermore, comparator 110 may also consider tainting nodes. An example taint may be a Kubernetes feature that marks a node as inappropriate for the pods to be scheduled to the node unless the pod explicitly tolerates the taint. Thus, the nodes that are reserved (dedicated) for specific pods may be created. For example, the pods which require significant amount of the resources of the node be available to them in order to operate may be scheduled to nodes that are reserved for them. Thus, upon determining the nodes to deploy the given workload descriptors, taints for the nodes with the pods having corresponding toleration may be assigned.

Thus, examples described herein may provide a recommendation system that analyses the workload descriptors and uses a reverse-engineered Kubernetes scheduler algorithm to suggest an optimal infrastructure for deploying the corresponding pods. The recommendation system may generate a comparison of compute resources to be deployed across different cloud providers to know a best fit for a given sets of applications beforehand. Further, examples described herein may also consider the compute requirements for the native Kubernetes applications like a kube-proxy, a kube-scheduler, and the like that run on every cluster. In addition, the recommendation system may facilitate with the deployment planning of multi-cloud Kubernetes cluster, Geo expansion of an existing cluster, and migration planning of the existing cluster, each of which involves setting up a new cluster. Hence, examples described herein may significantly save time in provisioning the cluster and aid them in making the most resource and cost-effective infrastructure decisions.

In some examples, the functionalities described in FIG. 1, in relation to instructions to implement functions of parser 106, relation determining unit 108, comparator 110, recommendation unit 112, deployment unit 114, and any additional instructions described herein in relation to the storage medium, may be implemented as engines or modules including any combination of hardware and programming to implement the functionalities of the modules or engines described herein. The functions of parser 106, relation determining unit 108, comparator 110, recommendation unit 112, and deployment unit 114 may also be implemented by a respective processor. In examples described herein, the processor may include, for example, one processor or multiple processors included in a single device or distributed across multiple devices. Further, examples described herein may be implemented in multiple products such as vSphere Cloud Provider, VMware vRealize Operations, VMware Project Pacific, and other Kubernetes infrastructure provisioning related products.

Example Processes

Figure 3:
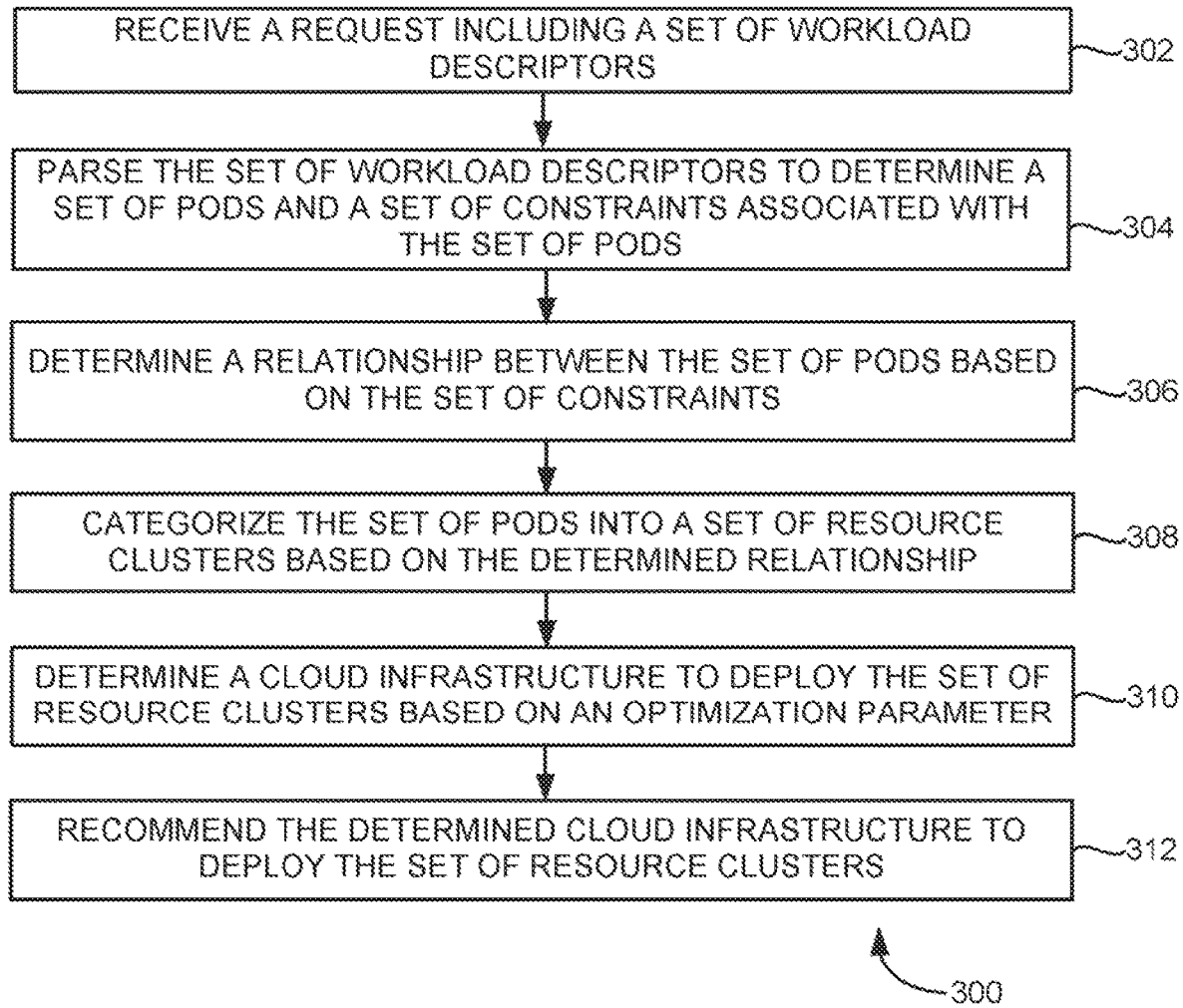
FIG. 3 is a flowchart illustrating an example method for recommending a cloud infrastructure to deploy a set of resource clusters.

FIG. 3 is a flowchart illustrating an example method 300 for recommending a cloud infrastructure to deploy a set of resource clusters. The process depicted in FIG. 3 represents generalized illustrations, and those other processes may be added, or existing processes may be removed, modified, or rearranged without departing from the scope and spirit of the present application. In addition, the process may represent instructions stored on a computer-readable storage medium that, when executed, may cause a processor to respond, to perform actions, to change states, and/or to make decisions. Alternatively, the process may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 302, a request including a set of workload descriptors may be received. In an example, the request including the set of workload descriptors may be received in a YAML file. At 304, the set of workload descriptors may be parsed to determine a set of pods and a set of constraints associated with the set of pods. In an example, the set of constraints may be selected from a group consisting of a pod affinity specification, a pod anti-affinity specification, a toleration specification, and the like. Further, each pod may include at least one container.

At 306, a relationship between the set of pods may be determined based on the set of constraints. An example relationship may include an attract relationship, a repel relationship, or a neutral relationship. The attract relationship or the repel relationship between a pair of pods may indicate that the pair of pods is to be placed on a same node or different nodes, respectively. In an example, determining the relationship between the set of pods may include generating a pod relation matrix. The pod relation matrix may represent the relationship between the set of pods based on the set of constraints.

At 308, the set of pods may be categorized into a set of resource clusters based on the determined relationship. In an example, categorizing the set of pods into the set of resource clusters may include:
- categorizing the set of pods into a set of resource groups based on the determined relationship.
- determining a relationship between the resource groups based on the set of constraints of pods in each resource group. In an example, determining the relationship between the resource groups may include generating a resource group relation matrix. The resource group relation matrix may represent the relationship between the set of resource groups based on the set of constraints.
- categorizing the set of resource groups into the set of resource clusters based on the relationship between the resource groups and resource requirements of the resource groups.

At 310, a cloud infrastructure to deploy the set of resource clusters may be determined based on an optimization parameter. In an example, determining the cloud infrastructure to deploy the set of resource clusters may include generating a comparison between different cloud service providers to deploy the set of resource clusters based on the optimization parameter and determining the cloud infrastructure associated with one of the cloud service providers based on the comparison. For example, the optimization parameter may include a resource optimization parameter, a cost optimization parameter, or a combination thereof.

In an example, determining the cloud infrastructure to deploy the set of resource clusters may include:
- for each resource cluster,
  - determining an inventory layout including a plurality of combinations of resource groups that are supported by nodes associated with the different cloud service providers. In an example, determining the inventory layout may include filtering the nodes having a resource capacity greater than a threshold percentage of resource requirements of each of the resource groups.
- selecting the cloud infrastructure associated with one of the cloud service providers based on the inventory layout associated with the set of resource clusters and the optimization parameter. The cloud infrastructure may include the nodes for deploying pods in the set of resource clusters.

Further, selecting the cloud infrastructure associated with one of the cloud service providers may include:
- comparing a cost attribute associated with different cloud service providers to deploy the set of resource clusters based on the inventory layout, and
- selecting the cloud infrastructure associated with one of the cloud service providers based on the comparison (e.g., the cloud infrastructure having a minimum cost may be selected).

At 312, the determined cloud infrastructure may be recommended to deploy the set of resource clusters. Further, pods in the set of resource clusters may be deployed on the determined cloud infrastructure in accordance with the recommendation. Thus, examples described herein may work at a planning and pre-deployment phase of deploying the pods. The prior planning taking into consideration the various Kubernetes scheduling constructs can lead to significantly lesser resource consumption as compared to manual analysis.

Figure 4A:
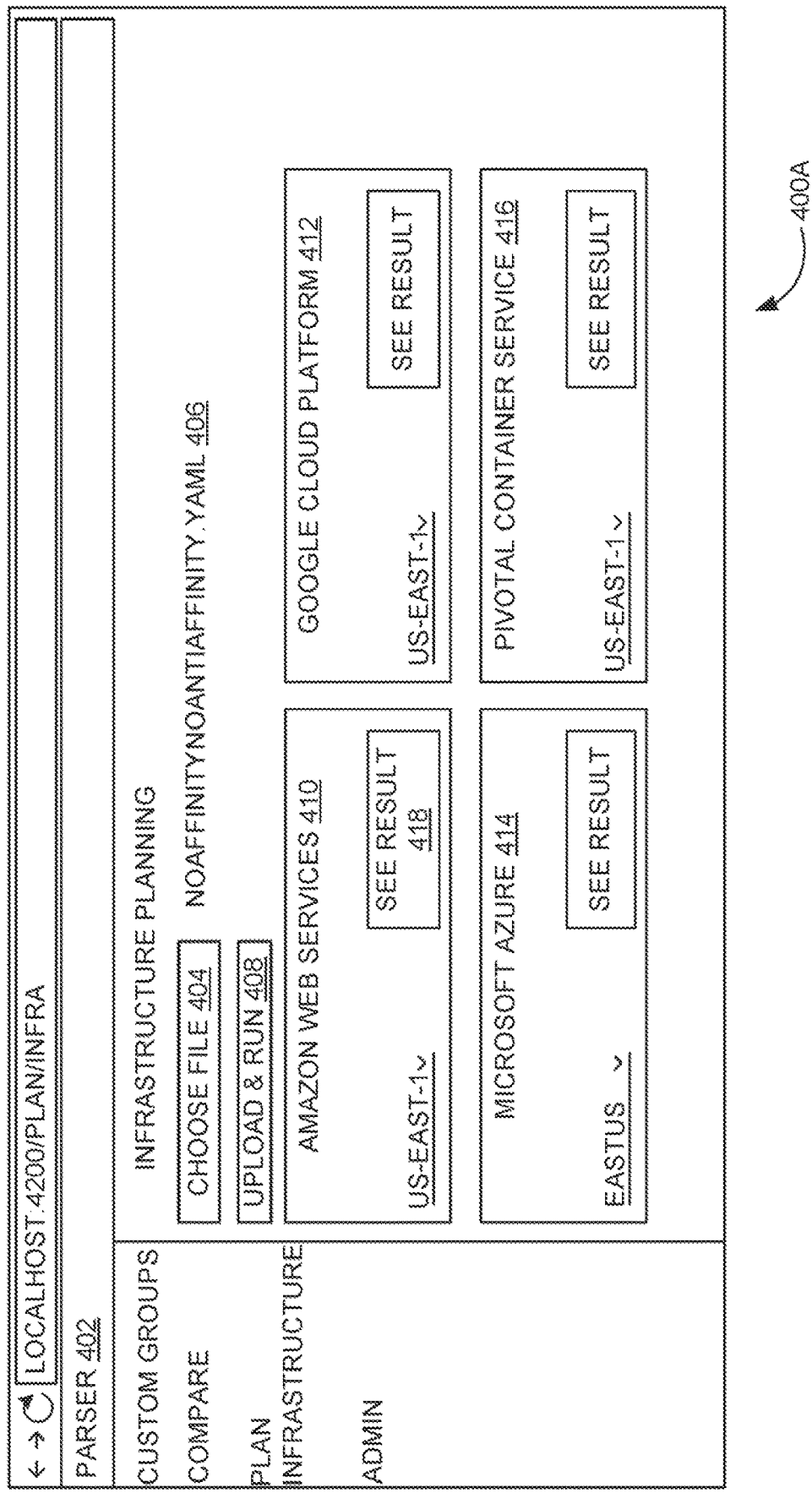
FIG. 4A is an example graphical user interface, depicting an option to provide a set of workload descriptors to determine an optimized cloud infrastructure.

FIG. 4A is an example graphical user interface 400A, depicting an option 404 to provide a set of workload descriptors for determining an optimized cloud infrastructure. As shown in example graphical user interface 400A, an option 404 may be provided to browse or select the workload descriptors (e.g., in a form of YAML file 406). Further, another option 408 may be provided to upload or submit the workload descriptors and execute an example method (e.g., method 300 of FIG. 3) on the inputted workload descriptors. Upon selecting option 408, a parser 402 analyses the workload descriptors. Based on the analyses, graphical user interface 400A may present multiple options of cloud infrastructures offered by different cloud providers (e.g., 410, 412, 414, and 416) as shown in FIG. 4A. Thus, a user can upload the workload descriptors and submit the same to generate the recommendation (i.e., an optimized cloud infrastructure).

Further, graphical user interface 400A may include an option (e.g., option 418) to view a detailed offering of corresponding cloud provider (e.g., 410). FIG. 4B is an example graphical user interface 400B depicting the offering associated with cloud provider 410 upon selecting option 418 of FIG. 4A. For example, the detailed offering may include nodes specification (e.g., OS, CPU, and memory specifications associated with different instance types) and corresponding cost details.

FIG. 4C is an example graphical user interface 400C depicting an option 472 to compare different cloud infrastructures offered by different cloud provides. As shown in FIG. 4C, based on the recommendation, the user also has option 472 to compare the cost across different cloud providers. The comparison across the cloud providers may provide a useful insight and help the user in an appropriate decision-making process to select an appropriate cloud infrastructure.

Figure 5:
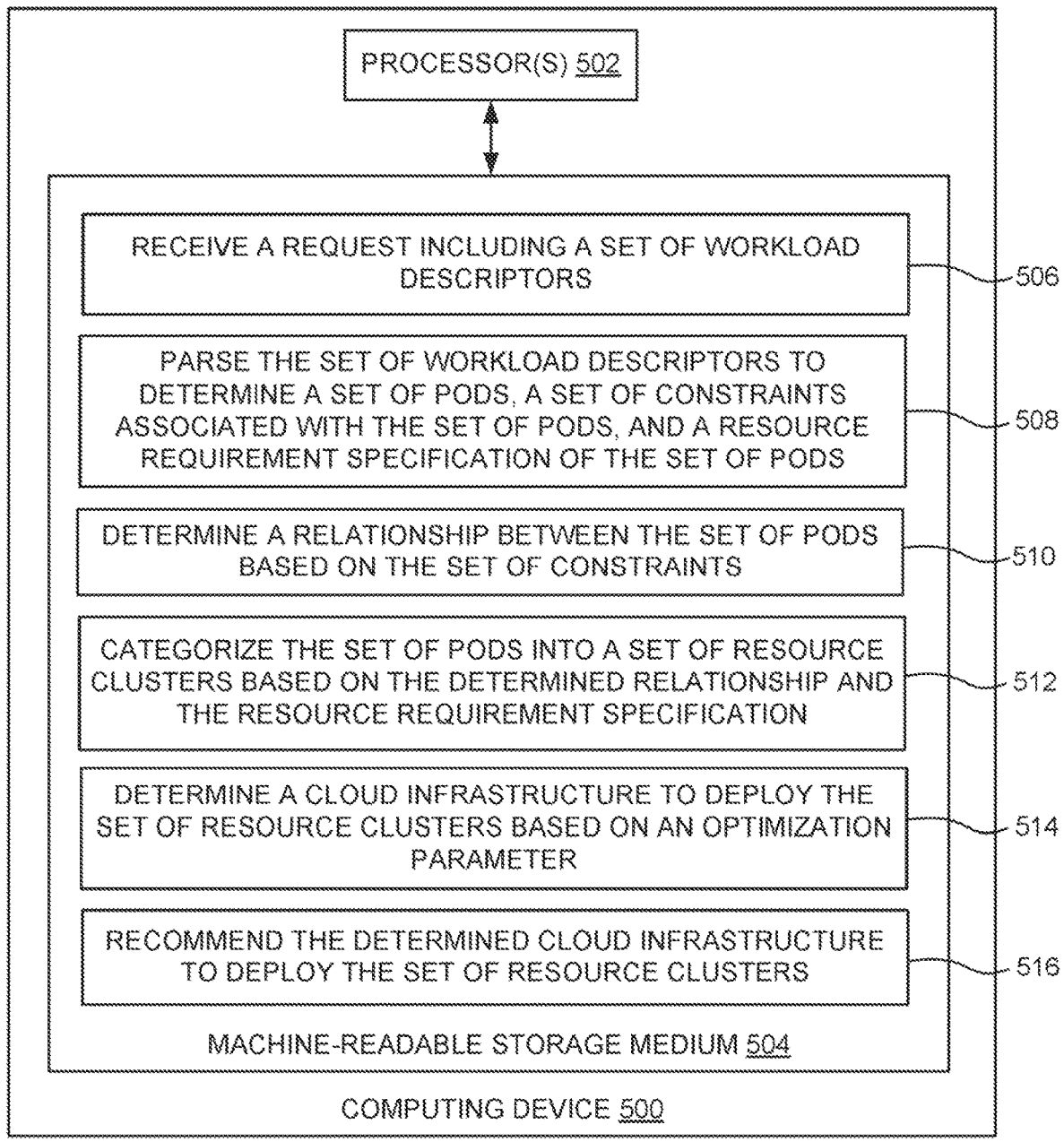
FIG. 5 is a block diagram of an example computing device including non-transitory computer-readable storage medium storing instructions to recommend a cloud infrastructure to deploy a set of resource clusters.

FIG. 5 is a block diagram of an example computing device 500 including non-transitory computer-readable storage medium 504 storing instructions to recommend a cloud infrastructure to deploy a set of resource clusters. Computing device 500 may include a processor 502 and machine-readable storage medium 504 communicatively coupled through a system bus. Processor 502 may be any type of central processing unit (CPU), microprocessor, or processing logic that interprets and executes machine-readable instructions stored in machine-readable storage medium 504.

Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing device 500.

Machine-readable storage medium 504 may store instructions 506-516. In an example, instructions 506-516 may be executed by processor 502 to recommend a cloud infrastructure to deploy a set of resource clusters. Instructions 506 may be executed by processor 502 to receive a request including a set of workload descriptors.

Instructions 508 may be executed by processor 502 to parse the set of workload descriptors to determine a set of pods, a set of constraints associated with the set of pods, and a resource requirement specification of the set of pods. In an example, the set of constraints may be selected from a group consisting of a pod affinity specification, a pod anti-affinity specification, a toleration specification, and the like.

Instructions 510 may be executed by processor 502 to determine a relationship between the set of pods based on the set of constraints. In an example, instructions to determine the relationship between the set of pods may include instructions to generate a pod relation matrix. The pod relation matrix may represent the relationship between the set of pods based on the set of constraints.

Instructions 512 may be executed by processor 502 to categorize the set of pods into a set of resource clusters based on the determined relationship and the resource requirement specification. Instructions 514 may be executed by processor 502 to determine a cloud infrastructure to deploy the set of resource clusters based on an optimization parameter. In an example, instructions to determine the cloud infrastructure to deploy the set of resource clusters may include instructions to:

compare the set of resource clusters to be deployed with cloud infrastructure associated with a set of cloud computing platforms; and determine the cloud infrastructure to deploy the set of resource clusters according to the optimization parameter.

In an example, instructions to determine the cloud infrastructure to deploy the set of resource clusters may include instructions to:

generate a comparison of the set of resource groups to be deployed with various cloud providers based on the optimization parameter, and determine the cloud infrastructure associated with one of the cloud service providers based on the comparison.

Instructions 516 may be executed by processor 502 to recommend the determined cloud infrastructure to deploy the set of resource clusters. In an example, instructions to recommend the determined cloud infrastructure to deploy the set of resource clusters may include instructions to:

determine one or more nodes associated with the cloud infrastructure to deploy the pods in each set of resource groups based on the optimization parameter, and recommend the one or more nodes in the cloud infrastructure to deploy the pods in each set of resource clusters.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

The above-described examples of the present solution are for the purpose of illustration. Although the solution has been described in conjunction with a specific example thereof, numerous modifications may be possible without materially departing from the teachings and advantages of the subject matter described herein. Other substitutions, modifications, and changes may be made without departing from the scope of the present solution. The features disclosed in this specification (including any accompanying claims, abstract and drawings), and/or the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. However, other forms, details, and examples can be made without departing from the spirit and scope of the present subject matter that is defined in the following claims.

What is claimed is:

1. A computer implemented method comprising:
   receiving a request including a set of workload descriptors;
   parsing the set of workload descriptors to determine a set of pods and a set of constraints associated with the set of pods;
   determining a relationship between the set of pods based on the set of constraints;
   categorizing the set of pods into a set of resource clusters based on the determined relationship;
   determining a cloud infrastructure to deploy the set of resource clusters based on an optimization parameter; and
   recommending the determined cloud infrastructure to deploy the set of resource clusters;
   wherein categorizing the set of pods into the set of resource clusters comprises:
      categorizing the set of pods into a set of resource groups based on the determined relationship;
      determining a relationship between the resource groups based on the set of constraints of pods in each resource group; and
      categorizing the set of resource groups into the set of resource clusters based on the relationship between the resource groups and resource requirements of the resource group;
   deploying pods in the set of resource clusters on the determined cloud infrastructure in accordance with the recommendation.

2. The computer implemented method of claim 1, wherein determining the cloud infrastructure to deploy the set of resource clusters comprises:
   generating a comparison between different cloud service providers to deploy the set of resource clusters based on the optimization parameter; and
   determining the cloud infrastructure associated with one of the cloud service providers based on the comparison.

3. The computer implemented method of claim 1, wherein determining the relationship between the set of pods comprises:
   generating a pod relation matrix, the pod relation matrix representing the relationship between the set of pods based on the set of constraints.

4. The computer implemented method of claim 1, wherein determining the relationship between the resource groups comprises:
   generating a resource group relation matrix, the resource group relation matrix representing the relationship between the set of resource groups based on the set of constraints.

5. The computer implemented method of claim 1, wherein determining the cloud infrastructure to deploy the set of resource clusters comprises:
for each resource cluster,
determining an inventory layout including a plurality of combinations of resource groups that are supported by nodes associated with the different cloud service providers; and
selecting the cloud infrastructure associated with one of the cloud service providers based on the inventory layout associated with the set of resource clusters and the optimization parameter, wherein the cloud infrastructure is to include the nodes for deploying pods in the set of resource clusters.

6. The computer implemented method of claim 5, wherein determining the inventory layout comprises filtering the nodes having a resource capacity greater than a threshold percentage of resource requirements of each of the resource groups.

7. The computer implemented method of claim 5, wherein selecting the cloud infrastructure associated with one of the cloud service providers comprises:
comparing a cost attribute associated with different cloud service providers to deploy the set of resource clusters based on the inventory layout; and
selecting the cloud infrastructure associated with one of the cloud service providers based on the comparison.

8. The computer implemented method of claim 1, wherein the set of constraints is selected from a group consisting of a pod affinity specification, a pod anti-affinity specification, and a toleration specification.

9. The computer implemented method of claim 1, wherein the relationship comprises an attract relationship, a repel relationship, or a neutral relationship, and wherein the attract relationship or the repel relationship between a pair of pods indicates that the pair of pods is to be placed on a same node or different nodes, respectively.

10. The computer implemented method of claim 1, wherein the optimization parameter comprises a resource optimization parameter, a cost optimization parameter, or a combination thereof.

11. The computer implemented method of claim 1, wherein the request including a set of workload descriptors is received in a YAML Ain't Markup Language (YAML) file.

12. The computer implemented method of claim 1, wherein each pod comprises at least one container.

13. A non-transitory machine-readable storage medium encoded with instructions that, when executed by a processor of a computing device, cause the processor to:
receive a request including a set of workload descriptors;
parse the set of workload descriptors to determine a set of pods, a set of constraints associated with the set of pods, and a resource requirement specification of the set of pods;
determine a relationship between the set of pods based on the set of constraints;
categorize the set of pods into a set of resource clusters based on the determined relationship and the resource requirement specification;
determine a cloud infrastructure to deploy the set of resource clusters based on an optimization parameter; and
recommend the determined cloud infrastructure to deploy the set of resource clusters;
wherein categorizing the set of pods into the set of resource clusters comprises:
categorizing the set of pods into a set of resource groups based on the determined relationship;
determining a relationship between the resource groups based on the set of constraints of pods in each resource group; and
categorizing the set of resource groups into the set of resource clusters based on the relationship between the resource groups and resource requirements of the resource group;
deploying pods in the set of resource clusters on the determined cloud infrastructure in accordance with the recommendation.

14. The non-transitory machine-readable storage medium of claim 13, wherein the set of constraints are selected from a group consisting of a pod affinity specification, a pod anti-affinity specification, and a toleration specification.

15. The non-transitory machine-readable storage medium of claim 13, wherein instructions to determine the relationship between the set of pods comprise instructions to:
generate a pod relation matrix, the pod relation matrix representing the relationship between the set of pods based on the set of constraints.

16. The non-transitory machine-readable storage medium of claim 13, wherein instructions to determine the cloud infrastructure to deploy the set of resource clusters comprise instructions to:
compare the set of resource clusters to be deployed with cloud infrastructure associated with a set of cloud computing platforms; and
determine the cloud infrastructure to deploy the set of resource clusters according to the comparison.

17. The non-transitory machine-readable storage medium of claim 13, wherein instructions to recommend the determined cloud infrastructure to deploy the set of resource clusters comprise instructions to:
determine one or more nodes associated with the cloud infrastructure to deploy the pods in each set of resource groups based on the optimization parameter; and
recommend the one or more nodes in the cloud infrastructure to deploy the pods in the each set of resource clusters.

18. The non-transitory machine-readable storage medium of claim 13, wherein instructions to determine the cloud infrastructure to deploy the set of resource clusters comprise instructions to:
generate a comparison of the set of resource clusters to be deployed with various cloud providers based on the optimization parameter; and
determine the cloud infrastructure associated with one of the cloud service providers based on the comparison.

19. A computing system comprising:
a processor; and
a memory coupled to the processor, wherein the memory comprises:
a parser to:
receive a request including a set of workload descriptors; and
parse the set of workload descriptors to determine a set of pods and a set of constraints associated with the set of pods;
a relation determining unit:
determine a relationship between the set of pods based on the set of constraints; and
categorize the set of pods into a set of resource clusters based on the determined relationship;
a comparator to:

determine a cloud infrastructure to deploy the set of resource clusters based on an optimization parameter; and a recommendation unit to
recommend the determined cloud infrastructure to deploy the set of resource clusters;

wherein the relation determining unit is to:
categorize the set of pods into a set of resource groups based on the determined relationship;
determine a relationship between the resource groups based on the set of constraints of pods in each resource group; and
categorize the set of resource groups into the set of resource clusters based on the relationship between the resource groups and resource requirements of the resource groups;

a deployment unit to:
deploy pods in the set of resource clusters on the determined cloud infrastructure in accordance with the recommendation.

20. The computing system of claim 19, wherein the comparator is to:
generate a comparison between different cloud service providers to deploy the set of resource clusters based on the optimization parameter; and
determine the cloud infrastructure associated with one of the cloud service providers based on the comparison.

21. The computing system of claim 20, further comprising:
an inventory to:
store information corresponding to the optimization parameter associated with the different cloud service providers.

22. The computing system of claim 19, wherein the comparator is to:
for each resource cluster,
determine an inventory layout including a plurality of combinations of resource groups that are supported by nodes associated with the different cloud service providers; and
select the cloud infrastructure associated with one of the cloud service providers based on the inventory layout associated with the set of resource clusters and the optimization parameter, wherein the cloud infrastructure is to include the nodes for deploying the pods in the set of resource clusters.

23. The computing system of claim 19, wherein the comparator is to filter the nodes having a resource capacity greater than a threshold percentage of resource requirements of each of the resource groups.

24. The computing system of claim 22, wherein the comparator is to:
compare a cost attribute associated with different cloud service providers to deploy the set of resource clusters based on the inventory layout; and
select the cloud infrastructure associated with one of the cloud service providers based on the comparison.

* * * * *